(12) United States Patent
Iitsuka

(10) Patent No.: US 6,661,621 B1
(45) Date of Patent: Dec. 9, 2003

(54) COMPOUND THIN FILM MAGNETIC HEAD

(75) Inventor: Daisuke Iitsuka, Osaka (JP)

(73) Assignee: Read-Rite SMI Corp., Osaka (JP)

( * ) Notice: Subject to any disclaimer, the term of this patent is extended or adjusted under 35 U.S.C. 154(b) by 0 days.

(21) Appl. No.: 09/443,879

(22) Filed: Nov. 19, 1999

(51) Int. Cl.$^7$ .............................. G11B 5/127
(52) U.S. Cl. ..................................... 360/317
(58) Field of Search ................. 360/317, 318

(56) References Cited

U.S. PATENT DOCUMENTS

| | | | | |
|---|---|---|---|---|
| 5,901,021 A | * | 5/1999 | Hirano et al. ............... | 360/122 |
| 6,134,079 A | * | 10/2000 | Koshikawa ................. | 360/317 |
| 6,151,193 A | * | 11/2000 | Terunuma et al. .......... | 360/317 |
| 6,154,346 A | * | 11/2000 | Sasaki ........................ | 360/317 |
| 6,201,669 B1 | * | 3/2001 | Kakihara .................... | 360/313 |
| 6,259,585 B1 | * | 7/2001 | Sasaki et al. ............... | 360/317 |
| 6,266,216 B1 | * | 7/2001 | Hikami et al. .............. | 360/317 |
| 6,278,580 B1 | * | 8/2001 | Sasaki ........................ | 360/317 |
| 6,404,601 B1 | * | 6/2002 | Rottmayer et al. ......... | 360/317 |

* cited by examiner

*Primary Examiner*—Allen Cao
(74) *Attorney, Agent, or Firm*—Burgess & Bereznak, LLP

(57) ABSTRACT

An inverse type compound thin film magnetic with good dispersion of the heat generated in the magnetoresistance (MR) element, ensuring thermal reliability. In one embodiment, an electromagnetic induction type thin film magnetic head, a magnetoresistance effect type thin film magnetic head, a first protective film, a heat dispersion layer with thermal conductivity higher than the first protective film, and a second protective film are formed in succession on a substrate.

8 Claims, 3 Drawing Sheets

COMPOUND THIN FILM MAGNETIC HEAD

BACKGROUND OF THE INVENTION

1. Field of the Invention

This invention concerns an inverse type compound thin film magnetic head, in which the electromagnetic induction type magnetic head for recording is formed before the magnetoresistance effect type magnetic head for reproduction.

2. Background Information

As computer performance is enhanced, there are demands for hard disk devices and other magnetic recording devices which are more compact and have greater capacities. However, because the media speed in a hard disk device depends on the disk diameter, the smaller is the size of ordinary magnetic recording devices, the slower is the media speed. Because the reproduction output of inductive magnetic heads depends on the media speed, as magnetic recording devices are made smaller and media speeds are reduced, the reproduction output declines.

To counter this, the magnetoresistance effect thin film magnetic head (hereafter "MR head") detects, as the reproduction output voltage, changes in the resistance of a magnetoresistance effect element (hereafter "MR element") using a magnetoresistance effect film the resistivity of which changes with the magnetic field. This head has the characteristic that the reproduction output of this head does not depend on the media speed, and a high reproduction output is obtained even at low media speeds, so that small-size, large-capacity magnetic recording devices, and in particular small-size, large-capacity hard disk devices, can be realized.

Further, in order to achieve still smaller sizes and larger capacities, multilayer film giant magnetoresistive (GMR) heads and spin-valve GMR heads (SV heads), utilizing the giant magnetoresistance effect of artificial lattice multilayer films and spin-valve films, are also being developed at a rapid pace.

Because these MR heads and GMR heads are capable of reproduction only, they are combined by layering with electromagnetic induction thin film magnetic heads as heads for information recording. In these widely adopted compound thin film magnetic heads, reproduction is performed by the MR head, and recording is performed by the inductive thin film magnetic head.

Many such compound thin film magnetic heads are formed with the MR head first formed on the substrate, and then the inductive thin film magnetic head formed by layering on top; but when forming the inductive thin film magnetic head, heat treatment processing is necessary, and so considerable heat is born by the MR head as well. For example, in forming the thin film coil for recording of the inductive thin film magnetic head, in order to flatten the resist used for insulation and improve exclusion by etching so as to improve the coil shape, the resist may be baked several times at approximately 280° C. On doing so, of course, the MR head already formed beneath is also subjected to considerable heat.

When in this way the MR head is subjected to high heat, the magnetoresistance effect of the MR element is degraded. In particular, GMR elements consist of metal layered films with film thicknesses of several nm or so; diffusion occurs at the interfaces between layers, degrading the film characteristics, and greatly reducing the rate of change of magnetoresistance.

Hence there is the problem that, even using an MR head, when it is part of a compound thin film magnetic head, because of the heat treatment accompanying the formation of the inductive thin film magnetic head, high reproduction sensitivity cannot be obtained; this problem is particularly serious in GMR heads using GMR elements.

Therefore in recent years a so-called inverse type compound thin film magnetic head has been developed (see for example laid-open patent application Hei9-245321), in which after forming the inductive thin film magnetic head for recording, the MR head is then formed, to prevent degradation of the MR head reproduction sensitivity by heat treatment during formation of the inductive thin film magnetic head.

An inverse type compound thin film magnetic head is able to prevent destruction of the MR element magnetoresistance effect during manufacturing processes and degradation of the reproduction sensitivity. However, the inverse type compound thin film magnetic heads of the prior art do not take into consideration the conduction of heat arising from the MR element (the read element), and so have been problematic with respect to thermal reliability and unsuitable for practical application.

An explanation with reference to the drawings follows. Previous non-inverse type compound thin film magnetic heads were formed by successive layering on an AlTiC substrate 41 of an undercoat 42 of alumina, a lower shield layer 43, a lower insulating layer 44 of alumina, an MR element film 45 with an MR element of permalloy or other material, an electrode layer (not shown) connected to both ends of said MR element film, an upper insulating layer 46, and an upper shield layer 47, as illustrated in FIG. 5, to comprise an MR head.

Further, the upper shield layer 47 of said MR head is common with the lower core layer of the inductive thin film magnetic head; on top of said lower core layer 47 is formed by layering an insulating layer 48, after which an inductive coil layer 49 is formed. After covering said coil layer 49 with an insulator 50, the upper core layer 51 is formed by layering, to comprise the electromagnetic induction thin film magnetic head. Thereafter a protective film 52 is formed by layering on the whole.

In this non-inverse type compound thin film magnetic head, the MR element 45 is positioned in proximity to the AlTiC substrate 41, so that heat generated from said MR element 45 is dispersed in the AlTiC substrate 41 with good thermal conductivity, and thermal reliability can be secured.

On the other hand, in the structure of an inverse type compound thin film magnetic head, the inductive thin film magnetic head is formed by layering in succession on an AlTiC substrate 61 of an undercoat 62 of alumina, a lower core layer 63, an insulator 64, a coil 65, a gap 66, and an upper core layer 67, as shown in FIG. 6.

The upper core layer 67 of said head is common with the lower shield layer of the magnetoresistance effect thin film magnetic head; by forming in layers on top of said lower shield layer 67, an insulating layer 68, MR element 69, and upper shield layer 70, an MR head is formed.

The entire surface is then covered by forming a protective film 71 of alumina.

In this inverse type compound thin film magnetic head of the prior art, there exist thick alumina layers with low thermal conductivity above and below the MR element (the undercoat 62 and the protective film 71), so that heat generated by the MR element is mainly transferred within the upper and lower shield layers 67, 70 with comparatively high thermal conductivity. However, because these shield layers 67, 70 have small thicknesses, the heat transfer resistance is high, and so problems with thermal reliability occur.

SUMMARY OF THE INVENTION

A compound thin film magnetic head is disclosed. In one embodiment, the compound thin film magnetic head includes an electromagnetic induction type thin film magnetic head formed over a substrate. A first protective film is then formed over the electromagnetic induction type thin film magnetic head. A heat dispersion layer is then formed over the first protective film. The heat dispersion layer has thermal conductivity higher than the first protective film. A second protective film then formed over the heat dispersion layer.

DESCRIPTION OF THE DRAWINGS

The present invention detailed illustrated by way of example and not limitation in the accompanying figures.

EXPLANATION OF SYMBOLS

Figure 1:
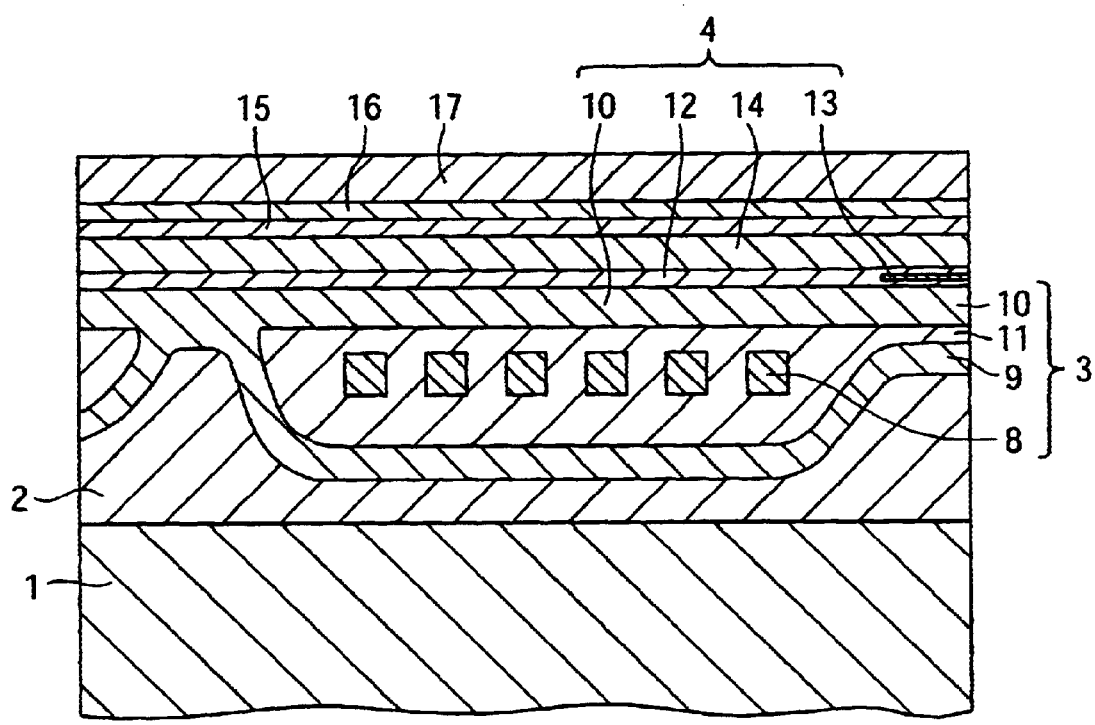
FIG. 1 is a vertical cross-sectional diagram of a compound thin film magnetic head of the first embodiment of this invention.

1 Substrate
3 Electromagnetic induction type thin film magnetic head
4 Magnetoresistance effect type thin film magnetic head (MR head)
15 First protective film
16 Heat dispersion layer
17 Second protective film
18 Protective film
19 Heat dispersion layer (insulator with higher thermal conductivity than alumina)
20 Protective layer (alumina)

DETAILED DESCRIPTION

In order to resolve the aforementioned problems, in this invention the following technical measure was devised. One embodiment of the present invention provides a product of high practicality in an inverse type compound thin film magnetic head with good dispersion of the heat generated in the MR element, ensuring thermal reliability.

The compound thin film magnetic head of this invention is created by forming in succession on a substrate an electromagnetic induction type thin film magnetic head, a magnetoresistance effect type thin film magnetic head, a first protective film, a heat dispersion layer with thermal conductivity higher than the first protective film, and a second protective film.

Through this inverse type compound thin film magnetic head, an adequate protective film thickness is secured using the first protective film and the second protective film, while easing the dispersion of heat generated by the magnetoresistance effect element (MR element) of the magnetoresistance effect thin film magnetic head using a heat dispersion layer with high thermal conductivity. Further, the material comprising this heat dispersion layer need not be an insulator, and there is a great amount of latitude in the choice of material, so that an appropriate material may be adopted in consideration of producibility, cost, magnetic head characteristics, and other factors.

As specific materials comprising the heat dispersion layer, nonmagnetic metals such as silver (Ag), aluminum (Al), gold (Au), copper (Cu), molybdenum (Mo), tungsten (W), palladium (Pd), lead (Pb), rhodium (Rh), carbon (C), tantalum (Ta), tin (Sn), and silicon (Si) and their alloys, as well as AlN, BeO, BN, SiC, and other inorganic materials may be adopted.

In the aforementioned compound thin film magnetic head, if the first protective film is made thinner than the second protective film, heat generated in the magnetoresistance effect element easily passes through the first protective film, to improve heat dispersion, while at the same time reliably protecting each layer using the second protective film, which is thicker than the first protective film.

Further, this invention provides a compound thin film magnetic head, in which are formed in succession on a substrate an electromagnetic induction type thin film magnetic head, a magnetoresistance effect type thin film magnetic head, and a protective film, and in which the aforementioned protective film is formed from an insulator with thermal conductivity higher than that of alumina, or from a layering of this with alumina. In this magnetic head also, conduction of heat generated in the MR element is good compared with the inverse type compound thin film magnetic heads of the prior art in which the protective film is formed from alumina, and thermal reliability is ensured.

As the insulator comprising this protective film, aluminum nitride (AlN) can be adopted.

Further, the protective layer on top of the magnetoresistance effect thin film magnetic head can consist of a layered film of alumina and an insulator with a thermal conductivity higher than alumina.

Below embodiments of this invention are explained based on the drawings.

FIG. 1 is a cross-sectional diagram of a compound thin film magnetic head of the first embodiment of this invention. Said thin film magnetic head is created by layering in succession, on an AlTiC substrate 1 ($Al_2O_3$—Ti—C system substrate) on which an undercoat 2 consisting of an alumina layer is formed, by layering an electromagnetic induction thin film magnetic head 3, a magnetoresistance effect thin film magnetic head (MR head) 4, a first protective film 15, a heat dispersion layer 16 with thermal conductivity higher than the first protective film 15, and a second protective film 17.

The induction thin film magnetic head 3 is provided with a coil 8 consisting of a copper (Cu) film, a lower core layer 9 (lower soft magnetic film layer for inductive recording) positioned below said coil 8, and an upper core layer 10 (upper soft magnetic film layer for inductive recording) positioned above the coil film 8; the lower core layer 9 and upper core layer 10 are connected at the center part of the coil 8.

The part of the lower core layer 9 opposing the magnetic media (the right edge part in FIG. 1) has formed an upward-protruding part coming into proximity with the part of the upper core layer 10 opposing the magnetic media; and these parts comprise the magnetic gap. The space between the lower core layer 9 and the upper core layer 10 is filled with alumina ($Al_2O_3$) or some other insulator 11, and the coil 8 is embedded in said insulator 11. The upper face of the upper core layer 10 is formed to be flat.

The upper core layer 10 is also the lower shield layer of the MR head 4; and said magnetic head 4 is provided with the aforementioned lower shield layer magnetic film 10, an insulating film 12 of alumina or some other nonmagnetic material, a magnetoresistance effect element film 13 (MR element film) embedded in the part of said insulating film 12 opposing the magnetic media, electrodes (not shown) connected to both ends of said MR element film 13 and embedded in the insulating film 12, and an upper shield layer magnetic film 14 consisting of a soft magnetic film.

As the aforementioned MR element film 13, a SAL-biased MR film, a dual-stripe MR film, a spin-valve GMR film, a multilayer GMR film, or various other films can be used. By positioning a domain-controlling film at the end of the magnetic film, and causing the free-side magnetic film to have a single-domain structure, waveform fluctuations called Barkhausen noise caused by external magnetic fields can be eliminated, and good reproduction output can be obtained.

As the soft magnetic material comprising the lower core layer 9, the upper core layer (lower shield layer) 10 and the upper shield layer 14, permalloy (NiFe alloy), FeAl alloy, Co-base amorphous alloy or other material can be adopted; in order to obtain good dispersion of the heat generated in the magnetic sensing part 13, it is preferable that a material with high thermal conductivity be adopted.

On top of the upper shield layer 14 is formed by layering a first protective layer 15 consisting of alumina or some other nonmagnetic material; on top of said protective layer 15 is formed by layering a heat dispersion layer 16 with a higher thermal conductivity than alumina; and on top of said heat dispersion layer 16 is formed by layering a second protective layer 17 consisting of alumina or some other nonmagnetic material. The aforementioned heat dispersion layer 16 consists of a material with a thermal conductivity higher than that of the first protective film 15 and the second protective film 17.

The first protective layer 15 is formed thinner than the second protective layer 17. Specifically, it is preferable that the film thickness of the first protective layer 15 be 0.05 $\mu$m or greater, and that the film thickness of the second protective film be 3 $\mu$m or greater. It is preferable that the film thickness of the heat dispersion layer 16 be 2 $\mu$m or greater.

Figure 2:
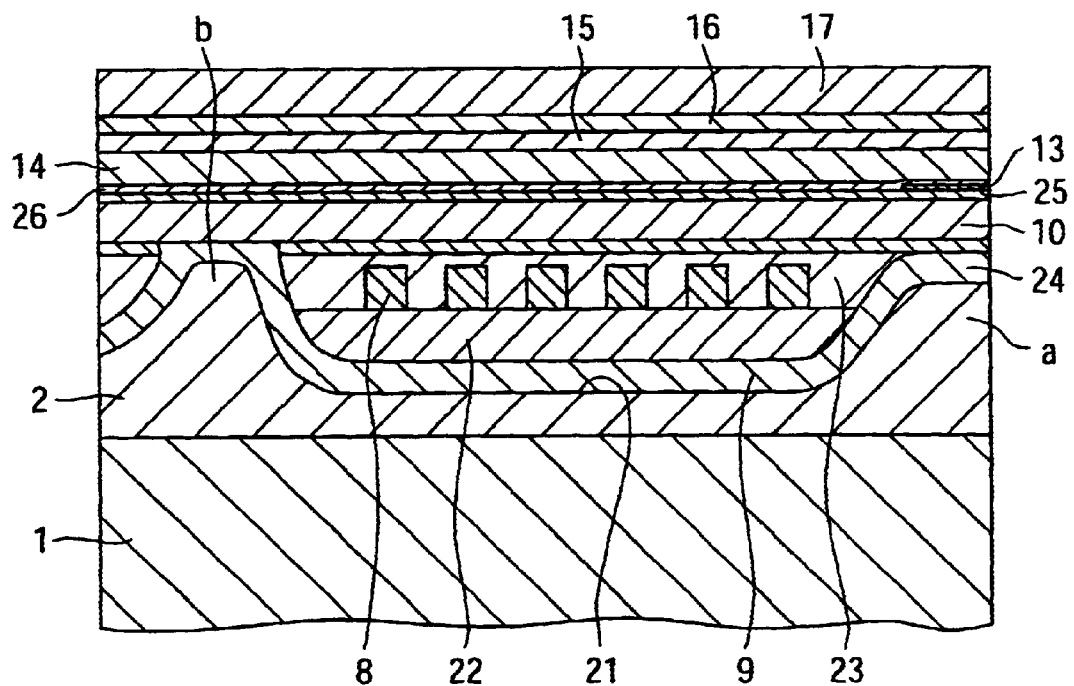
FIG. 2 is a vertical cross-sectional diagram used to explain manufacturing processes of the magnetic head.

Next, the manufacturing processes of the aforementioned compound thin film magnetic head are explained briefly, referring to FIG. 2.

First, an undercoat 2 is formed on top of an AlTiC substrate 1 by sputtering alumina or by evaporation deposition or other ways, and said undercoat 2 is subjected to wet etching or to dry etching using Ar ions, to form the depression 21, excluding the region a facing the magnetic recording media and the upper and lower core connecting part b.

Next, a lower core layer 9 (the lower magnetic film layer for inductive recording) which is continuous with the opposing region a, the neighboring depression 21, and the core connecting region b, is formed by layering. Then, after forming by layering an insulating layer 22 of alumina inside the depression 21, the coil 8 is formed by layering on top of said insulating layer 22.

Next, the surface is coated with resist, the aforementioned opposing region a and connecting region b are removed, the depression 21 is packed with the insulating material 23 covering the coil 8, and the insulating material 23 is hardened by heat treatment at approximately 220° C. to 280° C.

Next, after forming the magnetic gap layer 24 (the first insulating film) by layering of alumina, an aperture is formed in the gap layer 24 in the core connecting region b. The film thickness of this gap layer 24 becomes the write gap.

Next, the upper core layer 10 (the upper magnetic film layer for inductive recording) is formed on top of the gap layer 24, and is connected with the lower core layer 9 through the aperture formed in the gap layer 24.

After this, publicly known flattening techniques are used to flatten the entire surface.

Using the above processes, the inductive thin film magnetic head 3 is formed.

The upper core layer 10 of the inductive thin film magnetic head 3 is common with the lower shield layer of the MR head 4; and the lower gap layer 25 (the second insulating film) is formed by layering of alumina on top of said lower shield layer 10. Thereafter the MR film 13 is formed on top of the lower gap layer 25. After forming by layering electrode layers (not shown) connected to both ends of the MR film 13, an upper gap layer 26 is formed by layering to cover the MR film 13 and electrode layers. The aforementioned insulating film 12 consists of these gap layers 25, 26.

Thereafter, the MR head 4 is comprised by formation in layers of the upper shield layer 14.

On top of the MR head 4 is formed by layering the first protective film 15; on top of said first protective film 15 is formed by layering, using sputtering, ion plating, electrochemical plating or other ways, the heat dispersion layer 16; and on top of said heat dispersion layer 16 is formed the second protective film 17.

Using the magnetic head of the aforementioned embodiment, the recording head 3 is formed before formation of the MR element 13. Hence when using resist as the insulator 23 to insulate the coil 8, even if heat treatment is performed to harden the resist, intermixing into the surrounding soft magnetic layers due to heating of the component elements of the nonmagnetic metal layer enclosed between soft magnetic layers can be prevented, and so degradation of the MR element 13 can be prevented.

Further, rises in the temperature of the MR element 13 caused by the heat generated by the MR element 13 can be suppressed, since the heat transfer resistance is made small by the existence of the heat dispersion layer 16, and so thermal reliability can be ensured.

Figure 3:
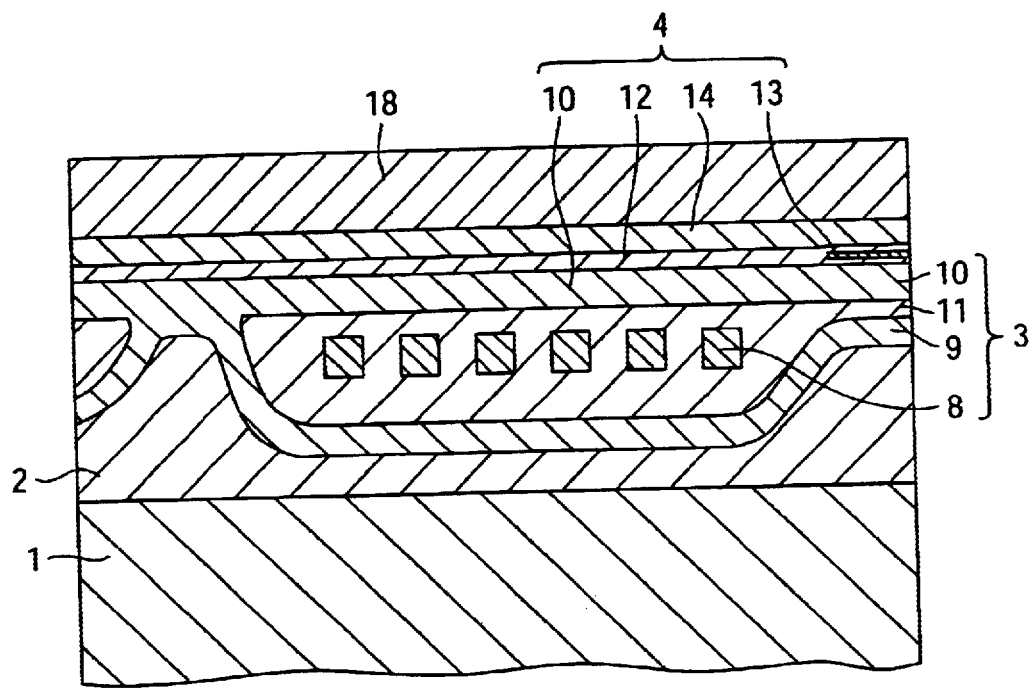
FIG. 3 is a vertical cross-sectional diagram of a compound thin film magnetic head of the second embodiment of this invention.

FIG. 3 is a cross-sectional diagram of a compound thin film magnetic head of a second embodiment of this invention. Components similar to those in the aforementioned first embodiment are given the same symbols, and a detailed explanation is omitted; different components and effects are here explained.

In this embodiment, on top of the MR head 4 is formed by layering a single protective film 18 of an insulator with thermal conductivity higher than alumina, for example aluminum nitride (AlN) or diamond-like carbon (DLC), using sputtering, plasma CVD, reactive sputtering or another method.

In this second embodiment also, by widely dispersing the heat generated by the MR element 13 within the protective film 18, rises in the temperature of the MR element 13 can be suppressed. Thus, thermal reliability can be ensured, and at the same time fewer layering processes are used, so that manufacturing costs can be reduced.

Figure 4:
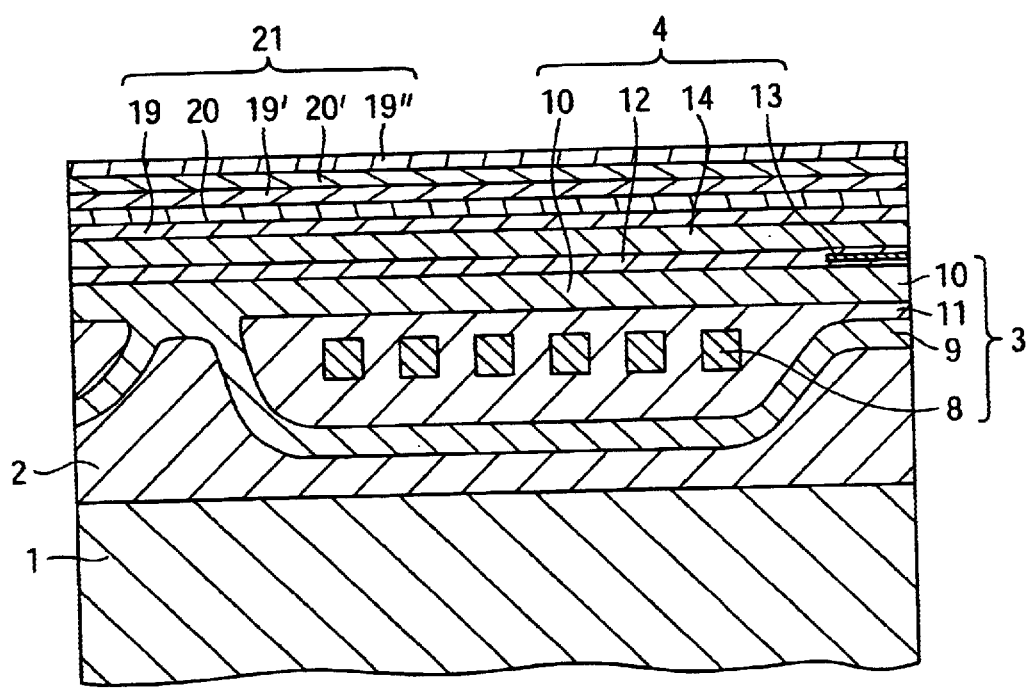
FIG. 4 is a vertical cross-sectional diagram of a compound thin film magnetic head of the third embodiment of this invention.
Figure 5:
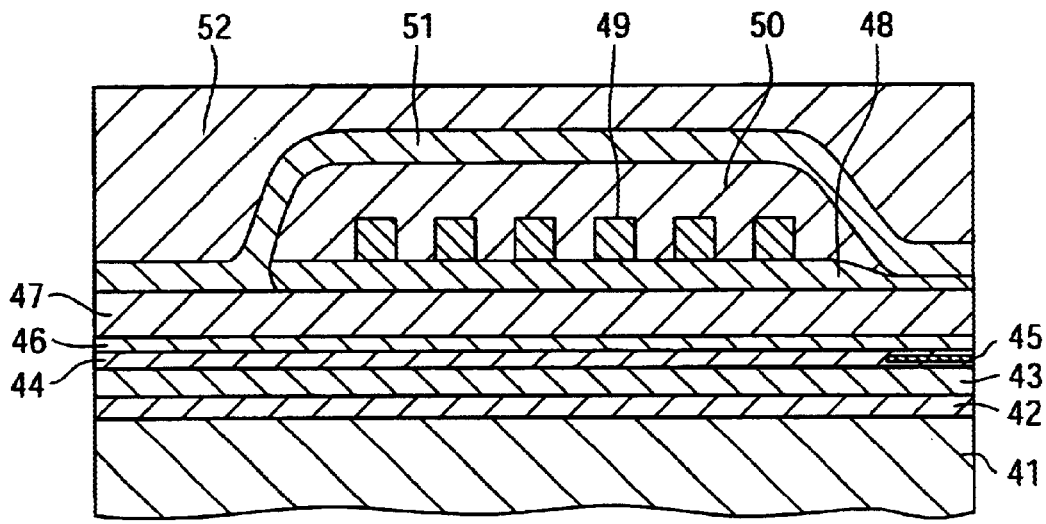
FIG. 5 is a vertical cross-sectional diagram of a non-inverse type compound thin film magnetic head of the prior art.
Figure 6:
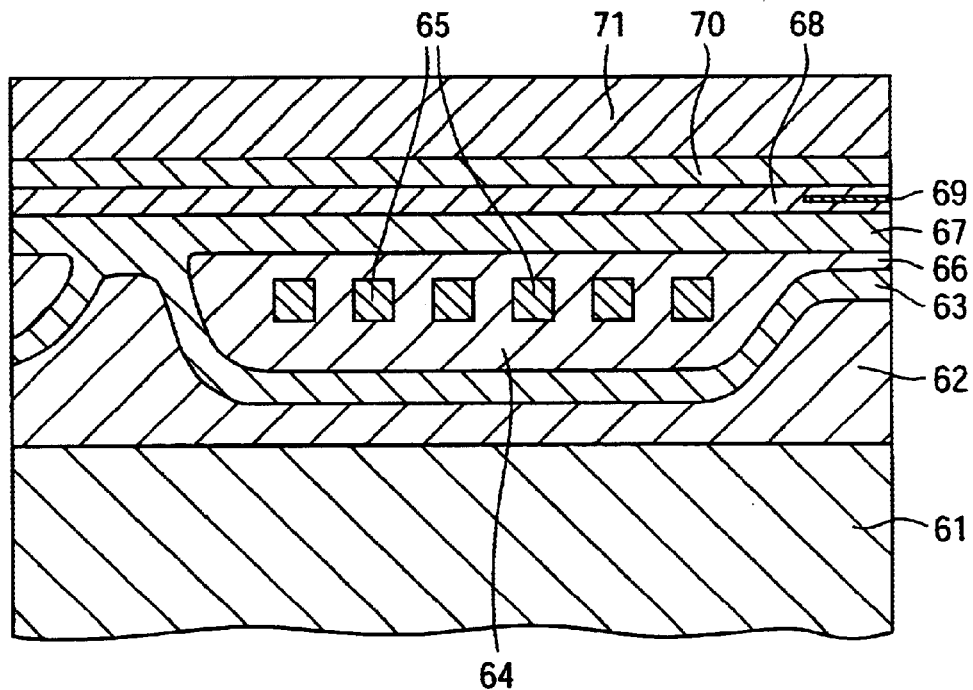
FIG. 6 is a vertical cross-sectional diagram of an inverse type compound thin film magnetic head of the prior art.

FIG. 4 is a cross-sectional diagram of a compound thin film magnetic head of a third embodiment of this invention. Components similar to those in the aforementioned first embodiment are given the same symbols, and a detailed explanation is omitted; different components and effects are here explained.

The first embodiment described above had a layered configuration in which an aluminum nitride (AlN) or other heat dispersion layer 16 was enclosed between an alumina or other first protective film 15 and a second protective film 17. In the compound thin film magnetic head of the third embodiment shown in FIG. 4, the protective layer on the MR head 4 is formed from a greater number of layers.

In this embodiment, a first alumina layer 19, first aluminum nitride (AlN) layer 20, second alumina layer 19', second aluminum nitride layer 20', and third alumina layer 19", are formed by layering in succession on an MR head 4. In this embodiment, the alumina layers 19, 19', 19" and the aluminum nitride layer 20, 20' are formed by layering in alternation, and these compose the protective layer 21.

In this embodiment, by forming in layers the alumina layer 19 and aluminum nitride layer 20 in a double-layer state, thermal transfer efficiency of the protective layer 21 overall is improved, with the intention of suppressing rises in temperature of the MR element 13.

In the embodiment shown in FIG. 4, the protective layer 21 consists of a total of five layers of the alumina layers 19 and aluminum nitride layers 20. However, the number of layers may be freely chosen; a single alumina layer 19 and a single aluminum nitride layer 20 may be formed in layers, or conversely a total of six or more layers may be formed in layers.

In deciding the number of layers and the film thickness of the alumina layers 19 and the aluminum nitride layers 20, consideration should be paid to the need for the protective layer 21 as a whole to exhibit strength and rigidity comparable to the mechanical strength and rigidity of publicly known protective layers.

An example of this embodiment in which alumina layers 19 and aluminum nitride layers 20 are formed in layers has been explained. Of course in place of the aluminum nitride layers 20, layers of Ag, Al or some other nonmagnetic metal or alloy of the same, as well as layers of BeO, SiC or some other inorganic material can be adopted.

In the above three embodiments have been explained. However, this invention is not limited to the aforementioned embodiments, and the design can be modified as appropriate.

With this invention, even in an inverse type MR-inductive compound thin film magnetic head, the heat generated from the MR element can be dispersed to the uppermost heat dispersion layer and to the protective film, and thermal reliability can be ensured.

In particular, when using a spin-valve GMR film consisting of an antiferromagnetic layer, fixed-side magnetic layer, nonmagnetic layer and free-side magnetic layer, a current of approximately several tens of $MA/cm^2$ is passed through the head, and aging due to electromigration may occur, so that there is a great need to prevent increases in the temperature of the GMR element serving as the magnetic sensing part. With this invention, good dispersion of the heat generated in the GMR element is possible, and the characteristics of spin-valve GMR heads can be greatly improved.

What is claimed is:

1. A compound thin film magnetic head, comprising:
    a substrate;
    an inductive type thin film magnetic head disposed over the substrate;
    a magnetoresistance effect type thin film magnetic head disposed over the inductive type thin film magnetic head;
    a first protective film disposed over the magnetoresistance effect type thin film magnetic head;
    a heat dispersion layer disposed over the first protective film, the heat dispersion layer comprising a material having a thermal conductivity higher than a thermal conductivity of the first protective film and
    a second protective film disposed over the heat dispersion layer.

2. The compound thin film magnetic head of claim 1 wherein the inductive type thin film magnetic head includes upper and lower core layers separated by a gap layer, and the magnetoresistance effect type thin film magnetic head includes a magnetoresistance effect element embedded in an insulating film between upper and lower shield layers, the lower shield layer being common with the upper core layer.

3. The compound thin film magnetic head of claim 2 wherein the insulating film comprises alumina.

4. The compound thin film magnetic head of claim 1 wherein the heat dispersion layer has a thickness of 2 µm or greater.

5. The compound thin film magnetic head of claim 1 wherein the heat dispersion layer comprises aluminum nitride.

6. The compound thin film magnetic head of claim 1 wherein the heat dispersion layer comprises diamond-like carbon.

7. The compound thin film magnetic head of claim 1 further comprising one or more double-layers disposed over the second protective film, each of the double-layers including an additional heat dispersion layer covered by an additional protective film.

8. The compound thin film magnetic head of claim 7 wherein the heat dispersion layer and the additional heat dispersion layer comprise aluminum nitride, and the first, second, and additional protective film comprise alumina.

* * * * *